(12) United States Patent
Chapman et al.

(10) Patent No.: US 10,105,940 B2
(45) Date of Patent: Oct. 23, 2018

(54) FORMATION OF COMPOSITE LAMINATES HAVING ONE OR MORE DIVERGENT FLANGES

(71) Applicant: The Boeing Company, Chicago, IL (US)

(72) Inventors: Michael Robert Chapman, Federal Way, WA (US); Lisa Christina Carlson, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 15/132,073

(22) Filed: Apr. 18, 2016

(65) Prior Publication Data

US 2017/0297317 A1   Oct. 19, 2017

(51) Int. Cl.
*B29C 70/34* (2006.01)
*B32B 37/10* (2006.01)
(Continued)

(52) U.S. Cl.
CPC .............. *B32B 37/14* (2013.01); *B29C 33/00* (2013.01); *B29C 70/345* (2013.01); *B32B 37/10* (2013.01); *B29C 33/42* (2013.01); *B32B 2305/72* (2013.01)

(58) Field of Classification Search
CPC ....... B29C 70/345; B29C 33/42; B29C 70/54; B29C 33/00; B29C 70/30; B29C 70/38; B32B 37/10; B32B 37/14
See application file for complete search history.

(56) References Cited

U.S. PATENT DOCUMENTS

| 4,534,813 | A | * | 8/1985 | Williamson | ........ B29C 33/3835 |
| | | | | | 156/191 |
| 5,041,179 | A | * | 8/1991 | Shinno | .................. B29C 70/386 |
| | | | | | 156/361 |

(Continued)

FOREIGN PATENT DOCUMENTS

| CA | 2695588 A1 * | 2/2009 | ............. B29C 53/04 |
| CA | 2720954 A1 * | 10/2009 | ............. B29C 53/04 |

(Continued)

OTHER PUBLICATIONS

Composite Material, Wikipedia, the free encyclopedia, Apr. 13, 2016.

(Continued)

*Primary Examiner* — Robert B Davis
(74) *Attorney, Agent, or Firm* — Duft & Bornsen, PC (57) ABSTRACT

Systems and methods are provided for divergent laminates. A method comprises providing a layup tool having a first upper face and a second upper face that rise to intersect each other at a ridge line, the layup tool further having a protrusion on top of a portion of the ridge line, and laying up a laminate onto the upper faces and the protrusion. The method also comprises placing a cure tool on top of the layup tool, the cure tool having a lower face that is dimensioned to mate with the upper faces along a portion of the ridge line that is not covered by the protrusion, thereby leaving a divergent flange of the laminate on top of the protrusion exposed, and sweeping the divergent flange of the laminate upward from the layup tool onto a vertical side the cure tool.

21 Claims, 11 Drawing Sheets

(51) Int. Cl.
*B32B 37/14* (2006.01)
*B29C 33/00* (2006.01)
*B29C 33/42* (2006.01)

(56) References Cited

U.S. PATENT DOCUMENTS

| | | | | |
|---|---|---|---|---|
| 6,045,651 | A * | 4/2000 | Kline | B29C 70/342 |
| | | | | 156/285 |
| 2007/0138695 | A1* | 6/2007 | Krogager | B29C 70/345 |
| | | | | 264/259 |
| 2009/0025865 | A1* | 1/2009 | Weidmann | B29C 70/342 |
| | | | | 156/199 |
| 2010/0170989 | A1* | 7/2010 | Gray | B29C 70/30 |
| | | | | 244/123.1 |

FOREIGN PATENT DOCUMENTS

| | | | | | |
|---|---|---|---|---|---|
| CA | 2753251 | A1 * | 3/2012 | ......... | B29C 70/205 |
| CA | 2899392 | A1 * | 8/2014 | ......... | F04D 29/023 |

OTHER PUBLICATIONS

Spar (aeronautics), Wikipedia, the free encyclopedia, Apr. 13, 2016.

* cited by examiner

FORMATION OF COMPOSITE LAMINATES HAVING ONE OR MORE DIVERGENT FLANGES

FIELD

The disclosure relates to the field of composite design, and in particular, to forming tools for laminates that will be cured into composite parts.

BACKGROUND

Forming tools enable laminates of constituent material (e.g., carbon fiber) to be shaped into any of a variety of geometric shapes before they are cured into a composite part. Forming tools may also be utilized during curing of a laminate to ensure that the laminate does not deform or otherwise change shape while exposed to temperature and pressure (e.g., 350 degrees Fahrenheit and 90 pounds per square inch (PSI) of pressure from an autoclave).

While forming tools help to ensure that a laminate achieves a desired shape, certain part and tool geometries result in divergence of tows/plies of a laminate. If a laminate is stretched and shaped by a forming tool after lay-up in a manner that causes divergence, the resulting composite part may exhibit buckling and wrinkling at the location where the divergence was created. This in turn is undesirable in a composite part.

SUMMARY

Embodiments described herein are forming tools that include pre-built features that increase the amount of material laid-up in a laminate for a composite part, at locations where divergence is expected when the laminate is formed after lay-up. The extra material prevents the laminate from buckling when it experiences divergence, which in turn ensures that the composite part formed from the laminate is fabricated with an expected strength and geometry.

One embodiment is a method comprising providing a layup tool having a first upper face and a second upper face that rise to intersect each other at a ridge line, the layup tool further having a protrusion on top of a portion of the ridge line, laying up a laminate onto the upper faces and the protrusion, and placing a cure tool on top of the layup tool. The method also includes sweeping the divergent flange of the laminate upward from the layup tool onto a vertical side the cure tool.

Another embodiment is a system comprising a laminate that will be cured into a composite part, a layup tool for shaping the laminate, the layup tool comprising a first upper face and a second upper face that rise to intersect each other at a ridge line and support a web of the laminate, and a protrusion on top of a portion of the ridge line that supports a divergent flange of the laminate. The system also includes a cure tool on top of the layup tool. The cure tool comprises a lower section that is mated with the upper faces along a portion of the ridge line that is not covered by the protrusion, leaving the divergent flange of the laminate exposed, and a vertical side to which the divergent flange of the laminate is folded upward onto.

A further embodiment comprises a system having a layup tool for shaping a laminate that will be cured into a composite part, the layup tool comprising a first upper face and a second upper face that rise to intersect each other at a ridge line and are dimensioned to receive a web of the laminate, and a protrusion on top of a portion of the ridge line that is dimensioned to receive a divergent flange of the laminate. The system also includes a cure tool on top of the layup tool. The cure tool includes a lower section that is dimensioned to mate with the upper faces along a portion of the ridge line that is not covered by the protrusion, leaving the divergent flange of the laminate exposed, and a vertical side that is dimensioned to receive the divergent flange of the laminate when the divergent flange of the laminate is folded upward.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
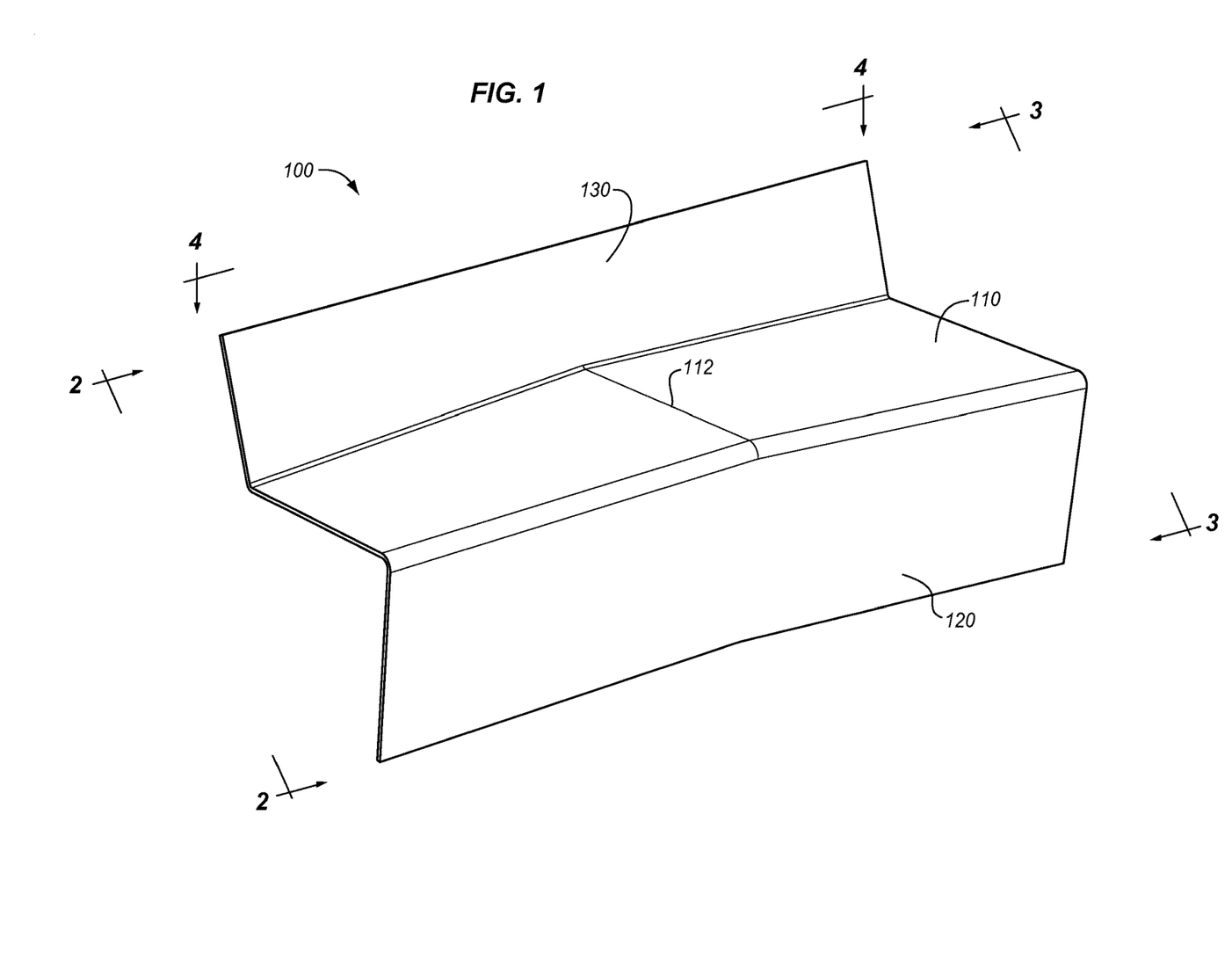
FIGS. 1-5 are diagrams illustrating a kinked laminate in an exemplary embodiment.
Figure 2:
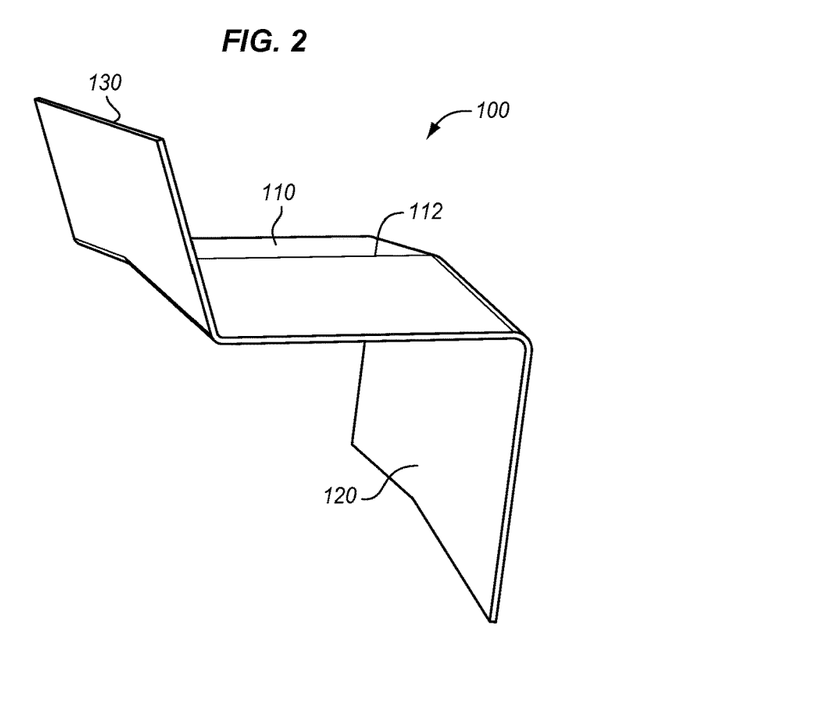
Figure 3:
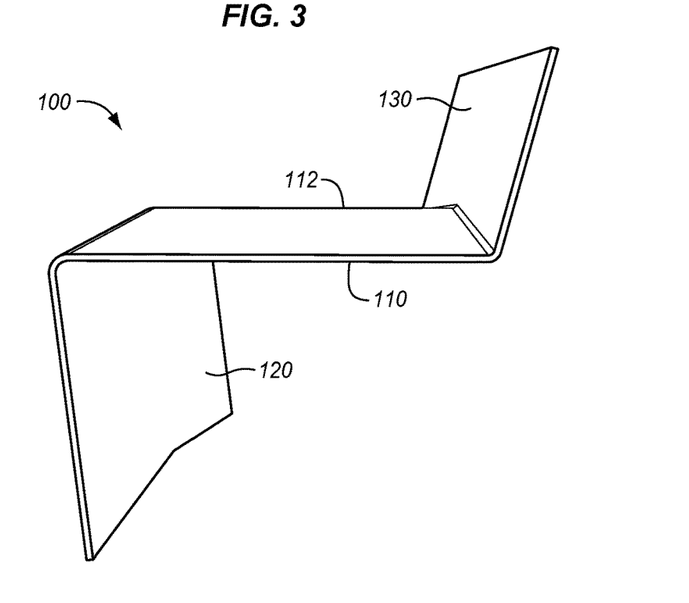
Figure 4:
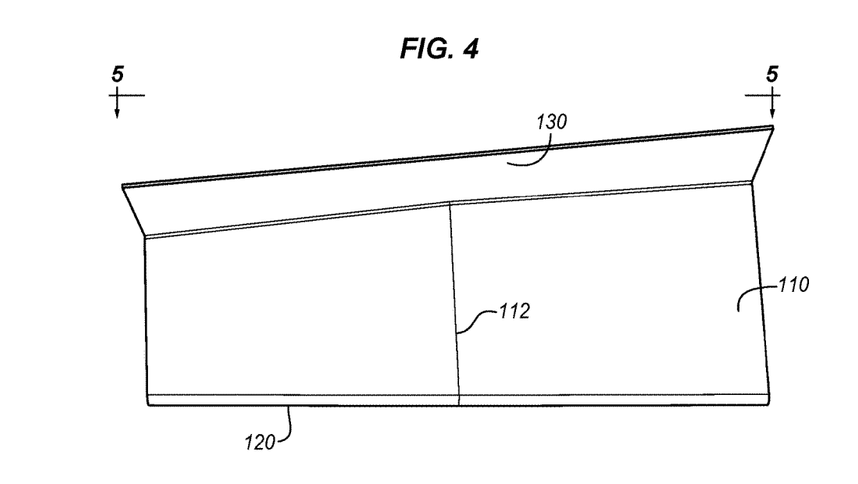
Figure 5:
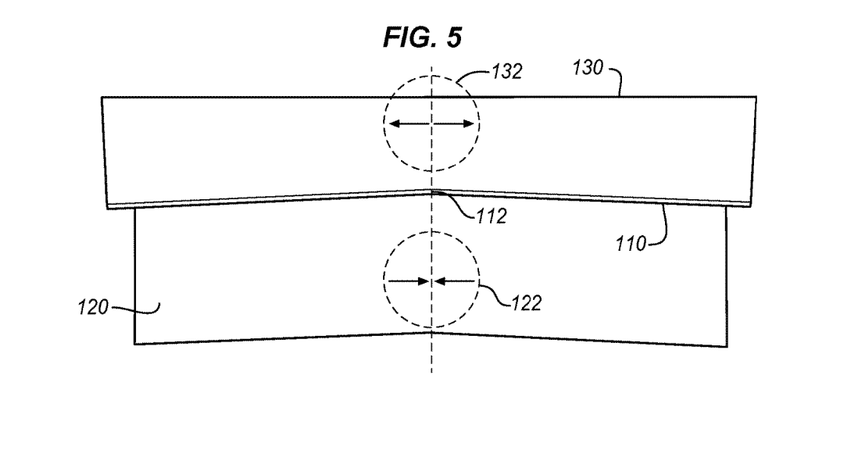

FIGS. 1-5 are diagrams illustrating a laminate 100 in an exemplary embodiment. FIG. 1 is a perspective views, while FIGS. 2-5 are various perspective, side, front, and bottom views indicated by view arrows 2-5 respectively. Specifically, FIG. 2 is a leading side view indicated by view arrows 2 of FIG. 1, FIG. 3 is a trailing side view of laminate 100 indicated by view arrows 3 of FIG. 1. FIG. 4 is a top view of laminate 100 illustrated by view arrows 4 of FIG. 1, and FIG. 5 is a rear view of laminate 100 indicated by view arrows 5 of FIG. 4. Laminate 100 comprises one or more layers of constituent material that are curable into a composite part (e.g., layers of material that together are curable into a carbon fiber part). The curing process may be achieved via vacuum bag techniques, may be achieved by placing laminate 100 in an autoclave, or via other suitable composite fabrication techniques.

As shown in FIG. 1, laminate 100 forms a "Z" spar, and laminate 100 is kinked. That is, laminate 100 is kinked about ridge line 112. Furthermore, as shown by FIG. 5, when laminate 100 is kinked it enforces convergence 122 on convergent flange 120, and enforces divergence 132 on divergent flange 130. This means that constituent material becomes "bunched" at 122 (which may lead to wrinkle formation) and "stretched" at 132 (which may lead to bridging). This issue relating to convergence and divergence may cause laminate 100 to warp in an unintended manner or even tear when creased/folded, which is undesirable. In further embodiments, laminate 100 may for a "C" spar, "J" spar, "L" spar, "T" spar, or any suitable shape.

Figure 12:
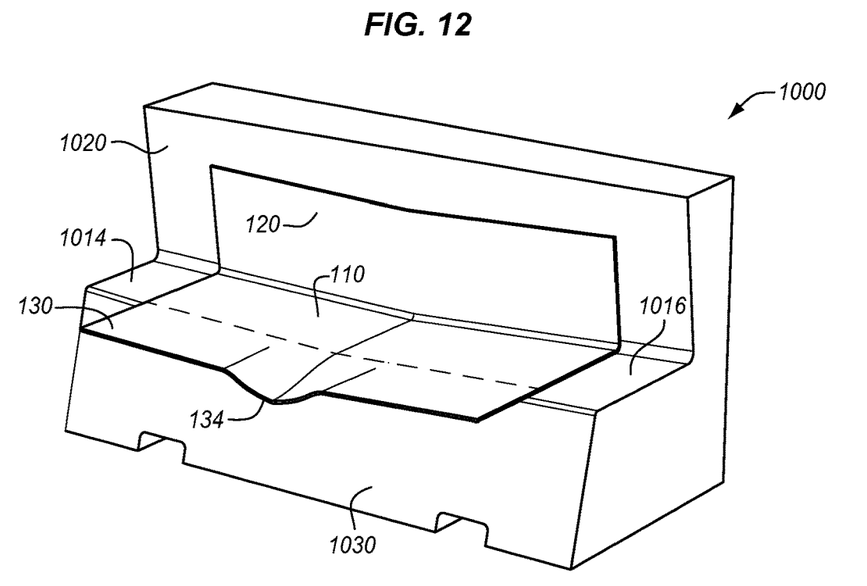
Figure 13:
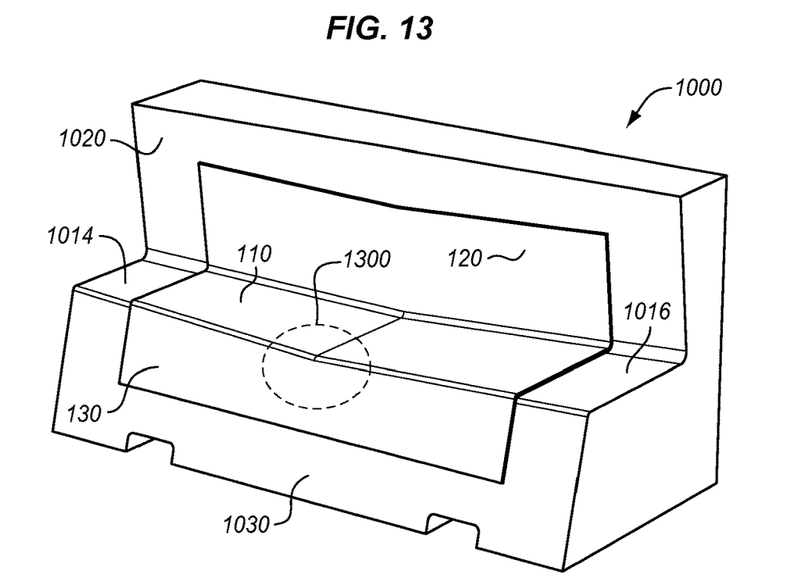
Figure 14:
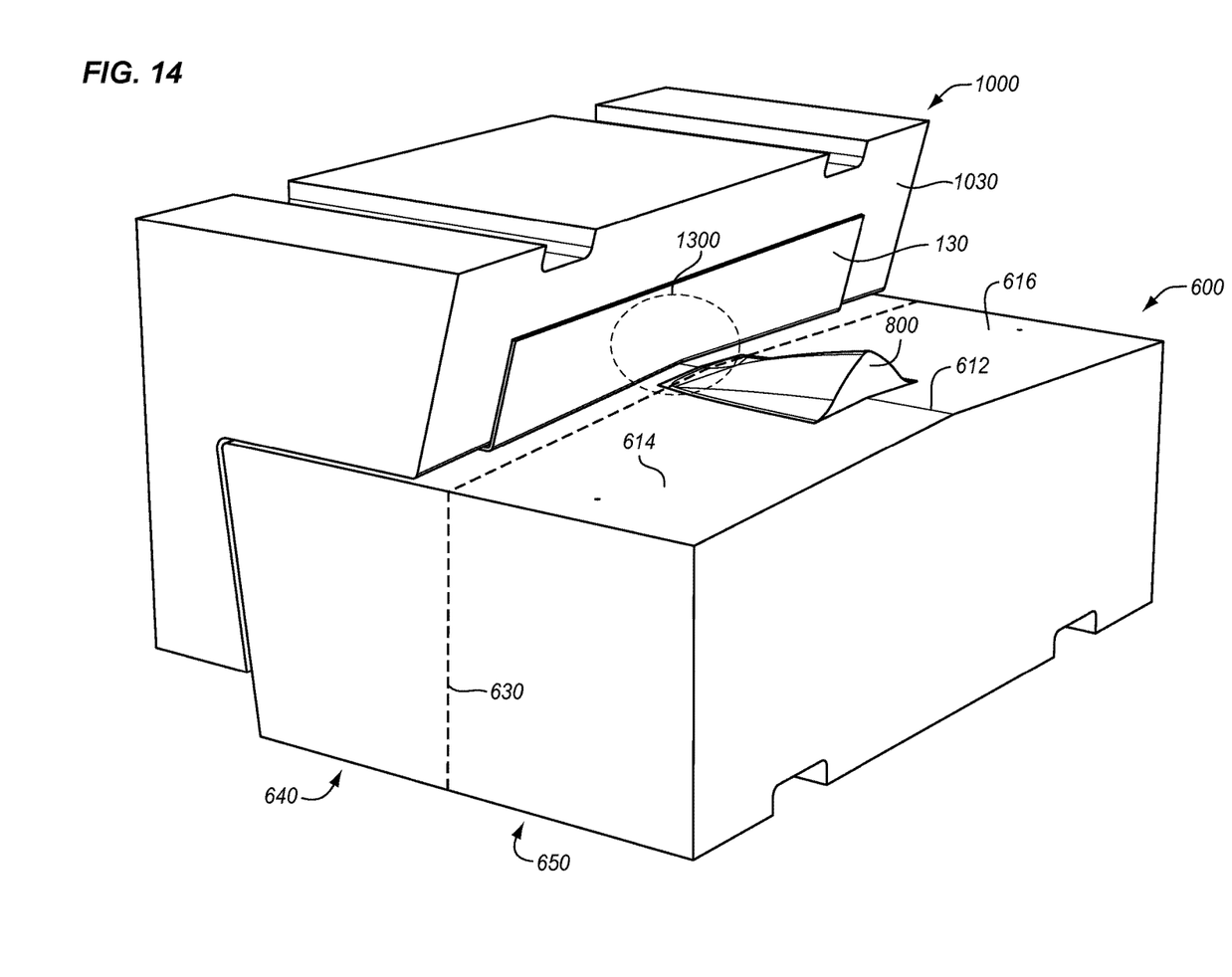
FIG. 14 is a diagram illustrating a layup tool mated with a cure tool in an exemplary embodiment.

FIGS. 6-14 illustrate forming tools that are capable of addressing issues related to convergence and divergence in laminates that are being formed. Specifically, FIGS. 6-9 illustrate a layup tool 600 (of FIG. 6) onto which a laminate 100 may be laid-up, FIGS. 10-13 illustrate a cure tool 1000 (of FIG. 10) that may be placed on top of layup tool 600 (as shown in FIG. 14) to complete the formation of a kinked laminate 100. Cure tool 1000 may also and/or alternatively be referred to as a forming tool, and may be actively used for supporting laminate 100 during curing and/or facilitating the forming of laminate 100.

Figure 6:
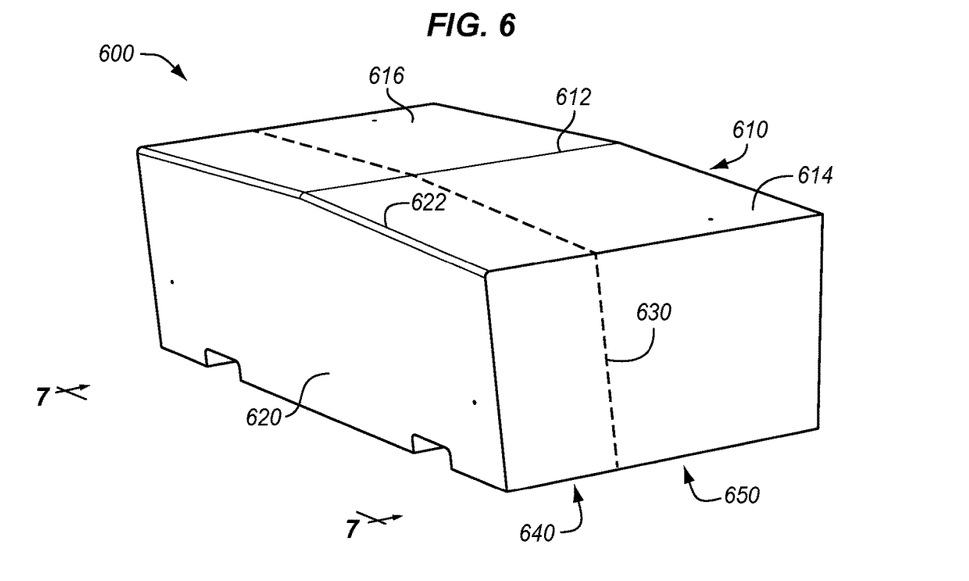
FIGS. 6-9 are diagrams illustrating a layup tool defining a shape for a laminate that will be cured into a composite part in an exemplary embodiment.
Figure 7:
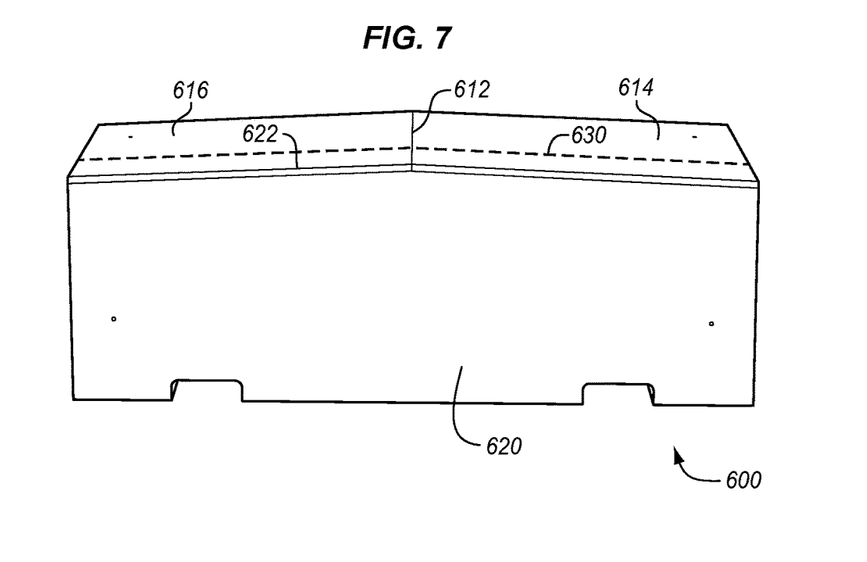
Figure 8:
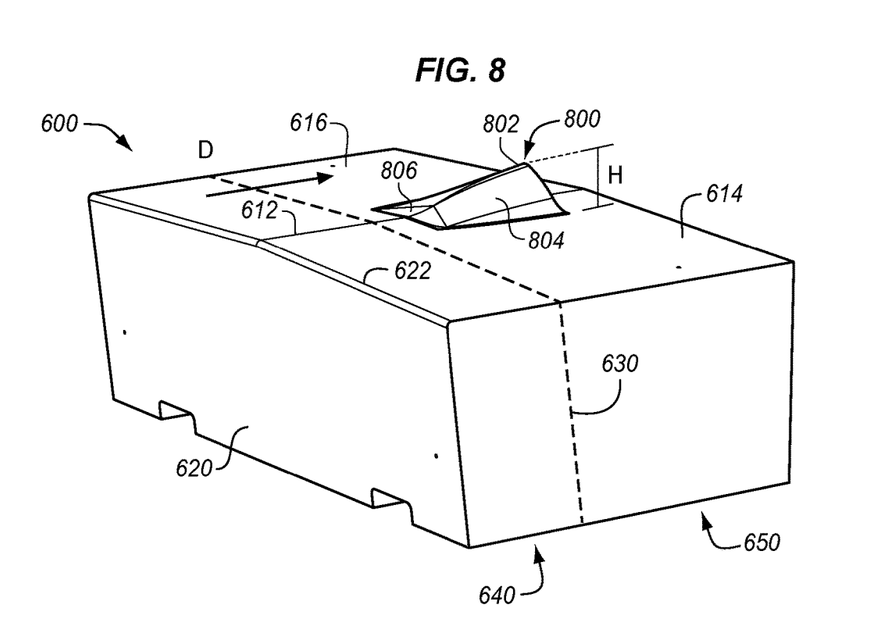

FIGS. 6-9 are diagrams illustrating a layup tool 600 defining a shape for a laminate 100 that will be cured into a composite part in an exemplary embodiment. As shown in FIG. 6, layup tool 600 includes an upper body 610, which includes upper faces 614 and 616. Faces 614 and 616 rise/slope upward (e.g., symmetrically) as they continue towards each other (e.g., at an angle of less than ten degrees), and eventually intersect at ridge line 612, in this embodiment causing upper body 610 to be v-shaped. Layup tool 600 further includes a vertical side 620, which intersects faces 614 and 616 at edge 622. In some embodiments, layup tool 600 may be split/separated at line 630 into separate segments 640 and 650 (e.g., layup tool 600 may be formed by bringing together segment 640 and segment 650). FIG. 7 is a view of layup tool 600 shown by view arrows 7 of FIG. 6. Meanwhile, FIG. 8 illustrates layup tool 600 as shown in the view of FIG. 6, further including a protrusion 800.

Figure 9:
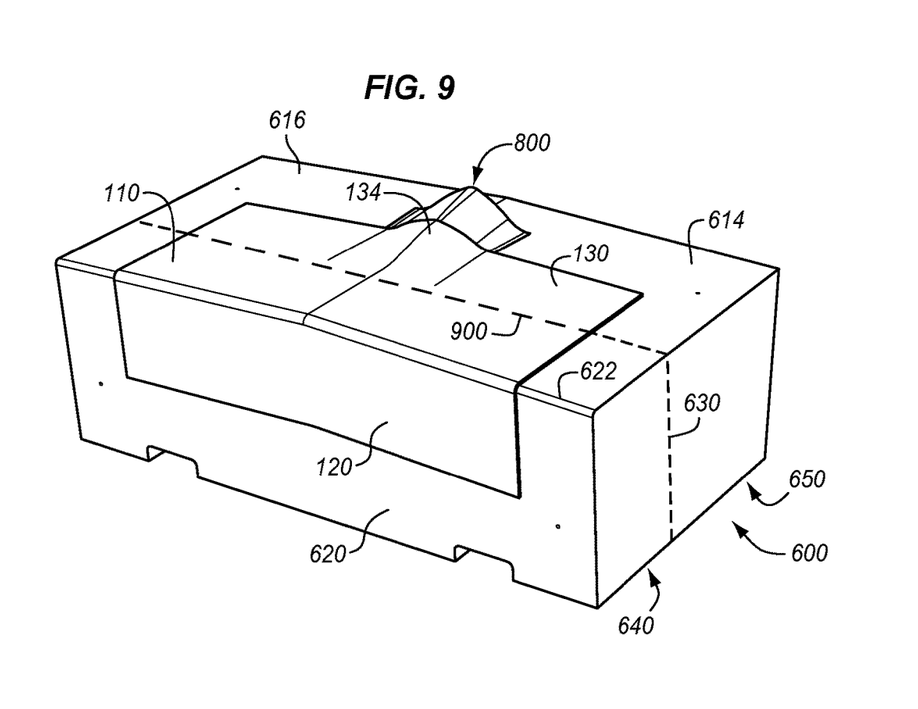

Protrusion 800 may comprise a component of layup tool 600, or may comprise an additional, separate piece. Protrusion 800 straddles ridge line 612 (e.g., symmetrically), and protrusion 800 increases in size (e.g., by height H) along ridge line 612 as ridge line 612 extends away from side 620. In short, a size of protrusion 800 increases based on distance along ridge line 612. This increase in size increases the amount of material in divergent flange 130 as divergent flange 130 continues to extend outward, which in turn enables divergent flange 130 to withstand greater amounts of divergence. Protrusion 800 includes segment 804 at upper face 614, and segment 806 at upper face 616. In FIG. 9, which is an additional perspective view of layup tool 600, laminate 100 has been laid-up onto layup tool 600. Divergent flange 130 of laminate 100 will be folded upward at fold line 900 (which may align with line 630) in order for laminate 100 to form the "Z" shape shown in FIG. 1. Convergent flange 120 covers side 620, while web 110 covers part of upper faces 616 and 614. Convergent flange 120 may be created during layup, for example, by dropping tows that would otherwise be placed onto convergent flange 120 during Automated Fiber Placement (AFP) layup processes, for example in order to ensure a uniform fiber density per unit area. Divergent flange 130 partially covers protrusion 800, and includes material 134 placed/laid on top of protrusion 800. During the layup of divergent flange 130, extra tows may be added onto protrusion 800 so that protrusion 800 has the same number of fibers per unit area as other portions of divergent flange 130.

Figure 10:
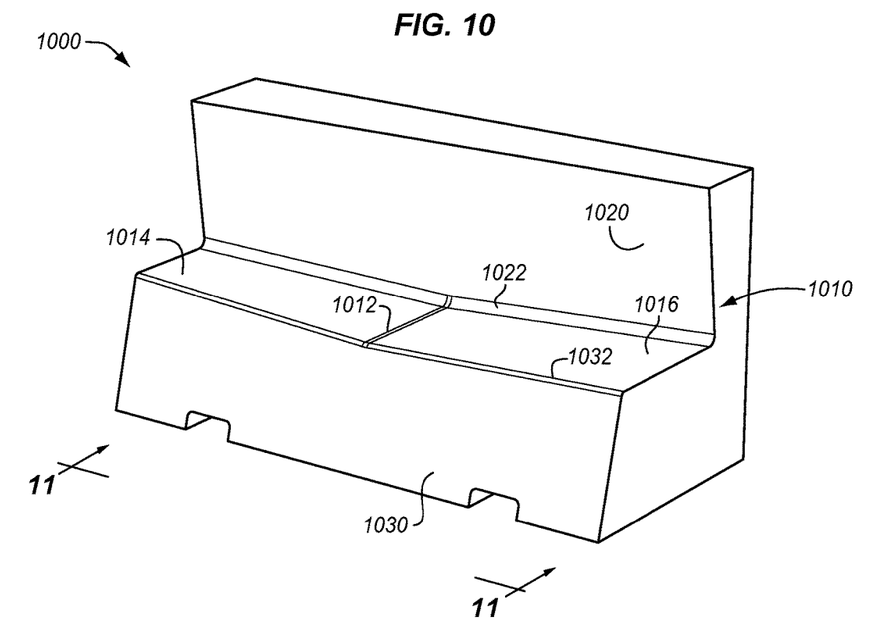
FIGS. 10-13 are diagrams illustrating a cure tool defining a shape for a laminate that will be cured into a composite part in an exemplary embodiment.
Figure 11:
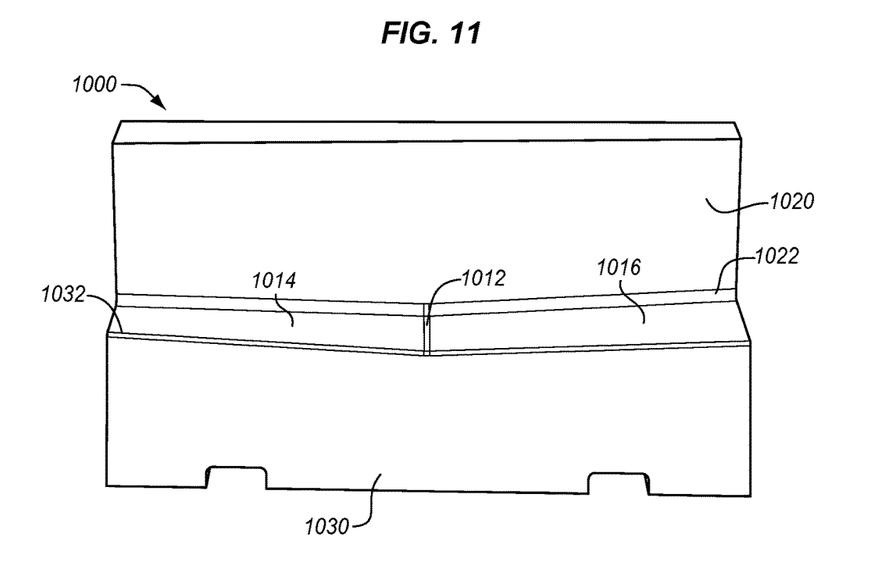

FIGS. 10-13 are diagrams illustrating a cure tool 1000 defining a shape for laminate 100. Cure tool 1000 includes vertical sides 1020 and 1030 (e.g., sides which in major part extend upward/downward), as well as lower faces 1014 and 1016, which meet at line 1012. Lower faces 1014 and 1016 therefore in this embodiment result in a v-shaped lower body 1010 which is dimensioned to mate with upper body 610 of layup tool 600 plus, for example, a thickness/gauge of the laminate at any given location. Edge 1022 forms a border between side 1020 and faces 1014 and 1016. Meanwhile, edge 1032 forms a border between side 1030 and faces 1014 and 1016. Edge 1032 may have a corner radius desired for folding divergent flange 130 at fold line 900. FIG. 11 is a view illustrated by view arrows 11 of FIG. 10.

In FIG. 12, laminate 100 is shown in relation to cure tool 1000 of FIG. 10. As shown in FIG. 12, convergent flange 120 of laminate 100 aligns with vertical side 1020, web 110 aligns with faces 1014 and 1016, and divergent flange 130 aligns with vertical side 1030, including material 134. In FIG. 13, divergent flange 130 is folded/swept onto side 1030. This causes divergent flange 130 to experience divergence, which is borne by excess material 134. Since the amount of divergence corresponds to the size of protrusion 800 onto which laminate 100 was laid-up, the divergence at zone 1300 utilizes material 134 without causing tearing or warping at laminate 100.

FIG. 14 is a diagram illustrating layup tool 600 mated with cure tool 1000 in an exemplary embodiment. Cure tool 1000 partially covers, but does not completely cover layup tool 600, leaving divergent flange 130 of laminate 100 exposed. As shown in FIG. 14, divergent flange 130, which originally covered protrusion 800 and part of faces 614 and 616, is swept upward onto side 1030 of cure tool 1000. This enforces divergence in zone 1300, which is absorbed by material laid-up onto protrusion 800.

Illustrative details of the operation of forming tools 600 and 1000 will be discussed with regard to FIG. 15. Assume, for this embodiment, that an operator desires to create a new composite part.

Figure 15:
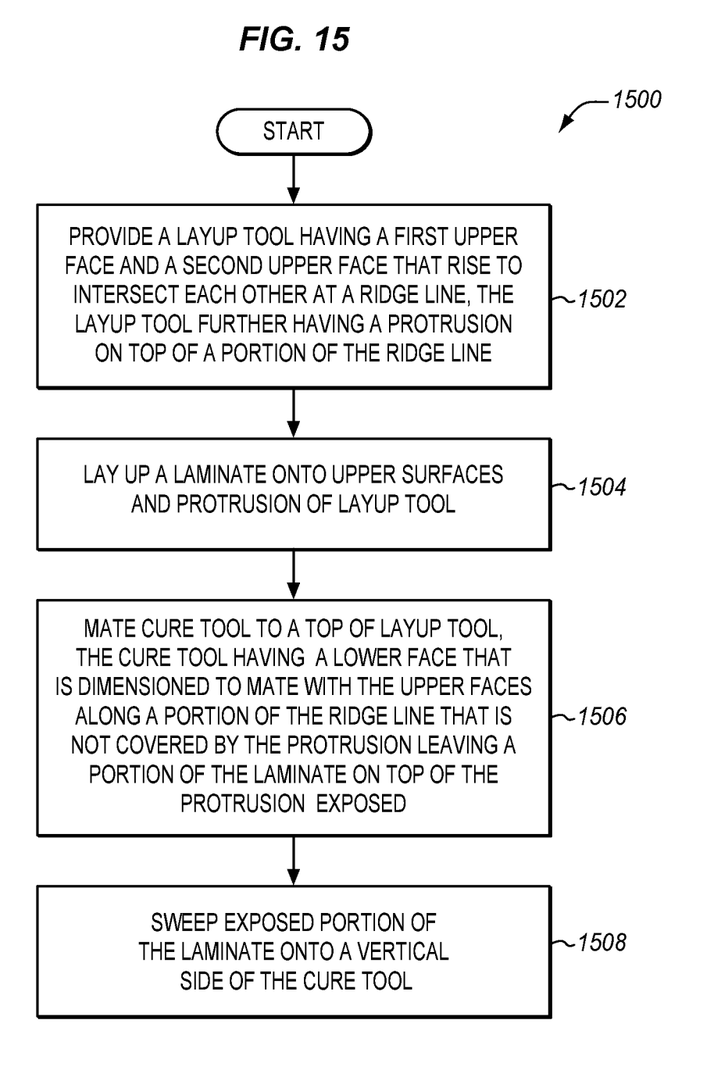
FIG. 15 is a flowchart illustrating a method for forming a laminate in an exemplary embodiment.

FIG. 15 is a flowchart illustrating a method 1500 for shaping/forming a laminate 100 in an exemplary embodiment. The steps of method 1500 are described with reference to forming tools 600 and 1000 of FIGS. 6-14, but those skilled in the art will appreciate that method 1500 may be performed in other environments and with other tools. The steps of the flowcharts described herein are not all inclusive and may include other steps not shown. The steps described herein may also be performed in an alternative order.

Layup tool 600 is provided, for example, by placing/providing layup tool 600 in a location where an Automated Fiber Placement (AFP) machine (not shown) is capable of operating (step 1502). Laminate 100 is then laid-up onto layup tool 600, including laying up web 110 and divergent flange 130 onto faces 614 and 616 as well as protrusion/hump 800 (step 1504, as shown in FIG. 9). After lay-up has been completed, cure tool 1000 is placed on top of layup tool 600 such that faces 1014 and 1016 sit atop web 110 in the same locations that faces 614 and 616 support web 110 (step 1506). This leaves divergent flange 130 of laminate 100 exposed since cure tool 1000 does not completely cover layup tool 600. Divergent flange 130, which remains exposed, is then swept upward onto side 1030 of cure tool 1000 (step 1508, as shown in FIG. 14).

As a part of this process, segment 650 of layup tool 600 may be removed to expose divergent flange 130, and constant pressure may be applied to divergent flange 130 at both ends of ridge line 112 to ensure that divergent flange 130 is properly swept upwards without issue via pressure applied by a caul plate. Layup tool 600 may be pressed to cure tool 1000 (which forms a "Z" shape) during this process in order to ensure that laminate 100 does not slip. Furthermore, heat may optionally be applied to divergent flange 130 during this process to facilitate the sweeping action. In embodiments where cure tool 1000 is utilized during curing as a cure tool, laminate 100 may be transferred to cure tool 1000 in its "Z" shape either before or after sweeping divergent flange 130 as desired.

Using method 1500 described above, extra material laid-up at protrusion 800 is available to handle divergence caused by sweeping divergent flange 130 upward. This means that divergent flange 130 does not experience warping or tearing, which is desirable to ensure that laminate 100 exhibits a desired strength and shape when cured into a composite part.

In a further embodiment layup tool 600 includes separable segments 640 and 650. Upper faces 614 and 616 have a sufficient width for laying up material for both web 110 and any to-be-formed divergent flanges (e.g., divergent flange 130). Protrusion 800 may be triangular or arc-shaped in cross-section, or may be any suitable shape. Material laid-up on protrusion 800 is part of divergent flange 130, which has yet to be formed but remains on the upper faces 614 and 616 starting at the intersection of ridge line 612. Protrusion 800 effectively ensures that extra material is laid-up for the to-be-formed divergent flange(s). In such an embodiment, a radius of edge 1032 of cure tool 1000 defines a forming radius for the to-be-formed divergent flange(s). Segment 650 of layup tool 600 is removed to expose divergent flange 130 and enable sweeping of divergent flange 130. This may be performed for example by moving segment 640 (including laminate 100) to cure tool 1000. Cure tool 1000 provides pressure to web 110 while divergent flange 130 is formed by sweeping with constant pressure, and potentially heat, on either side of ridgeline 112 around the radius defined by edge 1032 and up vertical side 1030 of cure tool 1000. The formed laminate may further be transferred to a separate cure tool matching its newly formed shape, or may be cured at cure tool 1000 which already matches the shape of laminate 100.

In a still further embodiment, layup tool 600 is not separable but is rather a single integral element. Upper faces 614 and 616 exhibit a sufficient enough width to allow material to be laid up for both web 110 and for to-be-formed divergent flange(s) (e.g., divergent flange 130). A protrusion 800 supports the to-be-formed divergent flange 130 as laid-up, and the shape of protrusion 800 provides extra material for the to-be-formed/swept divergent flange(s). Laminate 100 may be transferred to a cure tool (e.g., cure tool 1000) corresponding with the shape of laminate 100. Additional tooling (e.g., a caul plate, not shown) may further be used to stabilize the web while forming/sweeping the divergent flange 130 with constant pressure and/or heat. The pressure and/or heat may be applied around the radius of edge 1032 and up vertical side 1030 of cure tool 1000, on either side of the ridgeline 112. This method may be effective when a structured former (e.g. upright drape former) is used to form the flange.

EXAMPLES

In the following examples, additional processes, systems, and methods are described in the context of systems that utilize forming tools to fabricate composite parts for aircraft.

Figure 16:
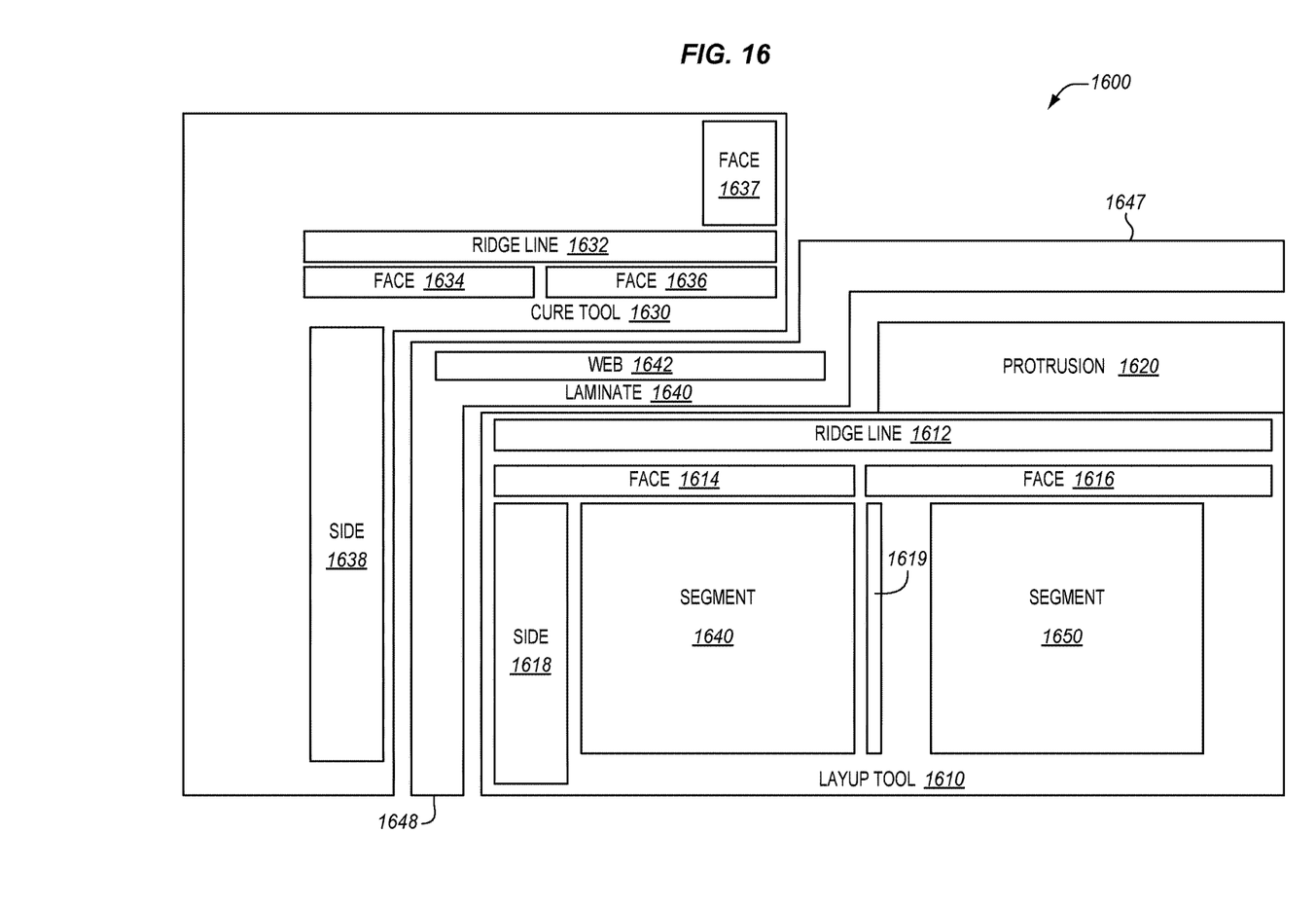
FIG. 16 is a block diagram of a system for shaping a laminate in an exemplary embodiment.

FIG. 16 is a block diagram of a laminate forming system 1600 in an exemplary embodiment. Laminate forming system 1600 includes layup tool 1610, protrusion 1620, cure tool 1630, and laminate 1640. Layup tool 1610 includes faces 1614 and 1616, which rise upwards to ridge line 1612. Since FIG. 16 is a block diagram, the exact geometric relationship between faces 1614 and 1616, and ridge line 1612 cannot be perfectly represented. Thus, faces 1614 and 1616 are illustrated merely as block elements placed below ridge line 1612 in this diagram. Layup tool 1610 also includes vertical side 1618. Protrusion 1620 sits atop layup tool 1610. Laminate 1640 is laid-up onto layup tool 1610 and protrusion 1620, and laminate 1640 includes convergent flange 1648, web 1642, and divergent flange 1647 atop protrusion 1620. Furthermore, layup tool 1610 includes line 1619, separating segment 1640 from segment 1650. Cure tool 1630 mates with layup tool 1610 on top of laminate 1640. In this embodiment, cure tool 1630 includes side 1638, and also includes side 1637 onto which divergent flange 1647 of laminate 1640 will be swept. Cure tool 1630 further comprises ridge line 1632, face 1634, and face 1636.

Figure 17:
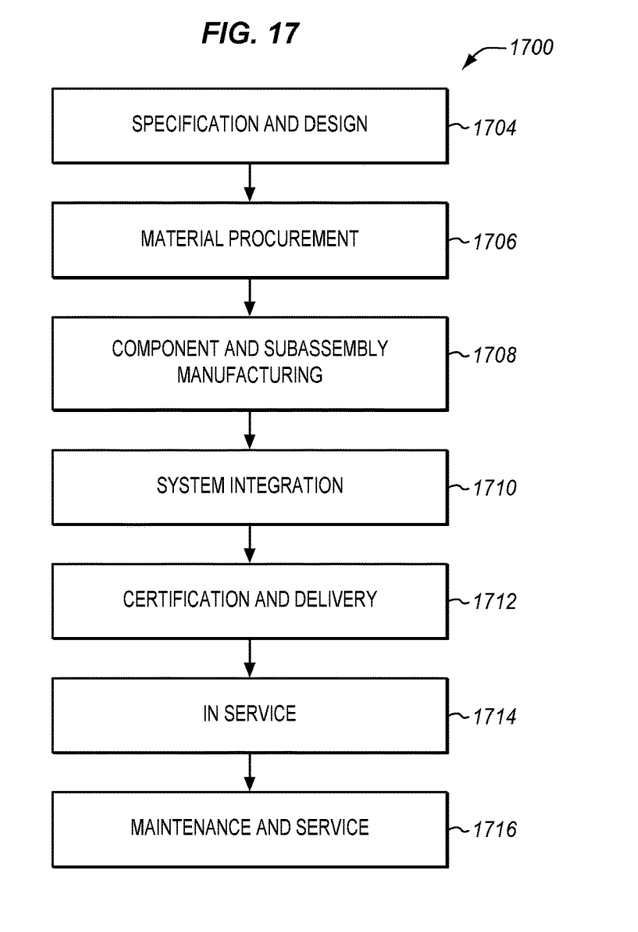
FIG. 17 is a flow diagram of aircraft production and service methodology in an exemplary embodiment.
Figure 18:
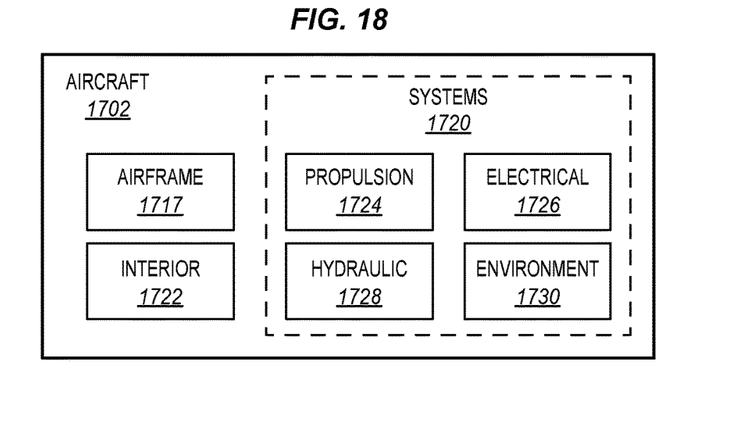
FIG. 18 is a block diagram of an aircraft in an exemplary embodiment.

Referring more particularly to the drawings, embodiments of the disclosure may be described in the context of an aircraft manufacturing and service method 1700 as shown in FIG. 17 and an aircraft 1702 as shown in FIG. 18. During pre-production, exemplary method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716 (which may also include modification, reconfiguration, refurbishment, and so on). Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by exemplary method 1700 may include an airframe 1718 with a plurality of systems 1720 and an interior 1722. Examples of high-level systems 1720 include one or more of a propulsion system 1724, an electrical system 1726, a hydraulic system 1728, and an environmental system 1730. Any number of other systems may be included. Although an aerospace example is shown, the principles of the invention may be applied to other industries, such as the automotive industry.

Apparatus and methods embodied herein may be employed during any one or more of the stages of the production and service method 1700. For example, components or subassemblies corresponding to production stage 1708 may be fabricated or manufactured in a manner similar to components or subassemblies produced while the aircraft 1702 is in service. Also, one or more apparatus embodiments, method embodiments, or a combination thereof may be utilized during the production stages 1708 and 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation, to maintenance and service 1716. For example, the techniques and systems described herein may be used for steps 1706, 1708, 1710, 1714, and/or 1716, and/or may be used for airframe 1718 and/or interior 1722.

In one embodiment, laminate 100 is cured into a composite part that operates as a stringer for airframe 118, and is manufactured during component and subassembly manufacturing 1108. The composite part may then be assembled into an aircraft in system integration 1110, and then be utilized in service 1114 until wear renders the composite part unusable. Then, in maintenance and service 1116, the composite part may be discarded, and a new laminate may be laid-up and cured to replace the old composite part. Forming tools 600 and 1000 may be utilized throughout component and subassembly manufacturing 1108 in order to form additional laminates for curing into composite parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
providing a layup tool having a first upper face and a second upper face that rise to intersect each other at a ridge line, the layup tool further having a protrusion on top of a portion of the ridge line;
laying up a laminate onto the upper faces and the protrusion;
mating a cure tool to a top of the layup tool; and
sweeping the divergent flange of the laminate upward from the layup tool onto a vertical side the cure tool.

2. The method of claim 1 wherein:
the cure tool has lower faces that are dimensioned to mate with the upper faces along a portion of the ridge line that is not covered by the protrusion, thereby leaving a divergent flange of the laminate on top of the protrusion exposed.

3. The method of claim 1 further comprising:
laying up a convergent flange of the laminate onto a vertical side of the layup tool.

4. The method of claim 1 wherein:
the laminate is laid-up symmetrically onto the layup tool with respect to the ridge line.

5. The method of claim 1 wherein:
sweeping the divergent flange of the laminate upward causes divergence in the divergent flange.

6. The method of claim 1 further comprising:
applying constant pressure to the divergent flange while sweeping the divergent flange.

7. The method of claim 1 further comprising:
curing the laminate into a composite part.

8. A system comprising:
a laminate that will be cured into a composite part;
a layup tool for shaping the laminate, the layup tool comprising:
a first upper face and a second upper face that rise to intersect each other at a ridge line and support a web of the laminate; and
a protrusion on top of a portion of the ridge line that supports a divergent flange of the laminate; and
a cure tool on top of the layup tool, the cure tool comprising:
a lower section that is mated with the upper faces and leaves the divergent flange of the laminate exposed; and
a vertical side to which the divergent flange of the laminate is folded upward onto.

9. The system of claim 8 wherein:
a size of the protrusion increases based on distance along the ridge line.

10. The system of claim 8 wherein:
a size of the protrusion corresponds with an amount of divergence that will occur when the divergent flange is folded upward onto the vertical side.

11. The system of claim 8 wherein:
the lower section is mated with the upper faces along a portion of the ridge line that is not covered by the protrusion.

12. A system comprising:
a layup tool for shaping a laminate that will be cured into a composite part, the layup tool comprising:
a first upper face and a second upper face that rise to intersect each other at a ridge line and receive a web of the laminate; and
a protrusion on top of a portion of the ridge line that receives a divergent flange of the laminate; and
a cure tool on top of the layup tool, the cure tool comprising:
a lower section that mates with the upper faces and leaves the divergent flange of the laminate exposed; and a vertical side that receives the divergent flange of the laminate when the divergent flange of the laminate is folded upward.

13. The system of claim 12 wherein:
a size of the protrusion increases based on distance along the ridge line.

14. The system of claim 12 wherein:
a size of the protrusion corresponds with an amount of divergence that will occur when the divergent flange is folded upward onto the vertical side.

15. The system of claim 12 wherein:
the protrusion is symmetrical with respect to the ridge line.

16. The system of claim 12 wherein:
the upper faces rise symmetrically towards the ridge line.

17. The system of claim 12 wherein:
the upper faces slope upward to the ridge line at an angle of less than ten degrees.

18. The system of claim 12 wherein:
the protrusion size corresponds with an amount of divergence that will occur in the divergent flange when the second portion is folded upward onto the side.

19. The system of claim 12 wherein:
the ridge line is straight.

20. The system of claim 12 wherein:
the lower section comprises two lower faces that intersect each other at a line.

21. The system of claim 12 wherein:
the layup tool further comprises a vertical side dimensioned to receive a convergent flange of the laminate.

* * * * *